United States Patent
Hollinger et al.

(10) Patent No.: US 10,878,441 B2
(45) Date of Patent: Dec. 29, 2020

(54) ADJUSTING ROUTE PARAMETERS USING A CENTRALIZED SERVER

(71) Applicant: International Business Machines Corporation, Armonk, NY (US)

(72) Inventors: Michael C. Hollinger, Austin, TX (US); Adriana Kobylak, Round Rock, TX (US); Andrew J. Geissler, Austin, TX (US); Nicholas E. Bofferding, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/183,249

(22) Filed: Nov. 7, 2018

(65) Prior Publication Data
US 2020/0143409 A1 May 7, 2020

(51) Int. Cl.
G06Q 30/00 (2012.01)
G06Q 30/02 (2012.01)
G01C 21/34 (2006.01)
G01C 21/36 (2006.01)

(52) U.S. Cl.
CPC ..... *G06Q 30/0233* (2013.01); *G01C 21/3484* (2013.01); *G01C 21/3697* (2013.01); *G06Q 30/0271* (2013.01)

(58) Field of Classification Search
None
See application file for complete search history.

(56) References Cited

U.S. PATENT DOCUMENTS

| 8,793,066 | B2 | 7/2014 | Panabaker et al. |
| 9,354,065 | B2 | 5/2016 | Ikavalko et al. |
| 2006/0129313 | A1 | 6/2006 | Becker et al. |
| 2009/0049044 | A1* | 2/2009 | Mitchell ............... G06Q 30/08 |
| 2010/0114626 | A1* | 5/2010 | Piccinini ............... G06Q 30/02 705/7.11 |
| 2010/0153008 | A1 | 6/2010 | Schwartz et al. |
| 2010/0161392 | A1* | 6/2010 | Ashby ............... G06Q 30/0284 705/13 |
| 2010/0250346 | A1* | 9/2010 | Bai ..................... G08G 1/0962 705/14.1 |
| 2011/0087430 | A1 | 4/2011 | Boss et al. |
| 2011/0087524 | A1 | 4/2011 | Boss et al. |

(Continued)

OTHER PUBLICATIONS

STIC EIC 3600 Search Report for application 16183249 dated May 14, 2020 (Year: 2020).*

(Continued)

*Primary Examiner* — Matthew T Sittner
(74) *Attorney, Agent, or Firm* — Patterson + Sheridan, LLP

(57) ABSTRACT

Method and apparatus for incentivizing ride share users, where offers are presented to the users and based on selected offers, corresponding fares may be reduced. A ride share incentivization may include user profile database, a business database, a route generator, and an advertisement generator. The route generator is configured to generate a first route and a first fare based on a first ride share request, and a second route and a second fare based on a second ride share request. The advertisement generator may generate offers for the rider share users and adjust the fares of the ride share users based on the selected offers. The advertisement generator may further adjust one or more offers when no offers are selected.

18 Claims, 6 Drawing Sheets

(56) References Cited

U.S. PATENT DOCUMENTS

| | | | |
|---|---|---|---|
| 2012/0041675 A1* | 2/2012 | Juliver | G06Q 30/0283 701/465 |
| 2012/0166267 A1* | 6/2012 | Beatty | G06Q 30/0219 705/14.21 |
| 2012/0191537 A1* | 7/2012 | O'Sullivan | G06Q 30/0269 705/14.49 |
| 2013/0046632 A1 | 2/2013 | Grigg et al. | |
| 2013/0054139 A1* | 2/2013 | Bodin | G01C 21/3438 701/468 |
| 2013/0054312 A1* | 2/2013 | Lection | G06Q 10/063 705/14.1 |
| 2013/0091018 A1* | 4/2013 | Yang | G06Q 30/02 705/14.58 |
| 2013/0218463 A1* | 8/2013 | Howard | G06O 30/0625 701/533 |
| 2014/0074757 A1* | 3/2014 | De Gennaro | G07B 13/04 705/417 |
| 2014/0082069 A1* | 3/2014 | Varoglu | G06Q 50/01 709/204 |
| 2014/0172727 A1* | 6/2014 | Abhyanker | G06Q 30/0645 705/307 |
| 2015/0012341 A1* | 1/2015 | Amin | G01C 21/3438 705/13 |
| 2015/0051822 A1* | 2/2015 | Joglekar | G08G 1/0145 701/118 |
| 2015/0051823 A1* | 2/2015 | Joglekar | G08G 1/0145 701/118 |
| 2015/0091506 A1* | 4/2015 | Hyde | B60L 53/12 320/108 |
| 2015/0161564 A1* | 6/2015 | Sweeney | G06Q 10/06311 705/338 |
| 2015/0161667 A1* | 6/2015 | Stevens | G06Q 30/0264 705/14.23 |
| 2015/0233719 A1* | 8/2015 | Cudak | B60W 50/12 701/23 |
| 2015/0278712 A1* | 10/2015 | Fujita | G06Q 10/06311 705/5 |
| 2015/0294352 A1* | 10/2015 | Deshpande | G06Q 30/0257 705/14.5 |
| 2015/0356665 A1* | 12/2015 | Colson | G06Q 30/0635 705/26.81 |
| 2016/0027306 A1* | 1/2016 | Lambert | G08G 1/202 701/117 |
| 2016/0027307 A1* | 1/2016 | Abhyanker | G06Q 50/01 701/117 |
| 2016/0138928 A1* | 5/2016 | Guo | G06F 16/29 701/537 |
| 2016/0209220 A1* | 7/2016 | Laetz | G08G 1/202 |
| 2016/0364678 A1* | 12/2016 | Cao | G06Q 50/30 |
| 2017/0055122 A1* | 2/2017 | Barron | H04W 4/021 |
| 2017/0089710 A1* | 3/2017 | Slusar | G01C 21/3602 |
| 2017/0090850 A1* | 3/2017 | Amrhein | G06Q 50/30 |
| 2017/0146351 A1* | 5/2017 | von Cavallar | G06Q 50/01 |
| 2017/0161784 A1* | 6/2017 | Malik | H04W 4/023 |
| 2017/0169366 A1* | 6/2017 | Klein | G06Q 50/30 |
| 2017/0243172 A1* | 8/2017 | Dayama | G06Q 10/1095 |
| 2017/0284820 A1* | 10/2017 | Dryjanski | G08G 1/202 |
| 2018/0039917 A1* | 2/2018 | Buttolo | G06Q 10/0631 |
| 2018/0058863 A1* | 3/2018 | Meyer | G01C 21/3415 |
| 2018/0293687 A1* | 10/2018 | Hardee | H04W 4/44 |
| 2018/0339712 A1* | 11/2018 | Kislovskiy | B60W 50/0205 |
| 2018/0342113 A1* | 11/2018 | Kislovskiy | G08G 1/202 |
| 2019/0033084 A1* | 1/2019 | Chen | G01C 21/3438 |
| 2019/0228367 A1* | 7/2019 | Longo | G06Q 10/06311 |
| 2019/0295014 A1* | 9/2019 | Fagnant | G06Q 10/02 |
| 2019/0347580 A1* | 11/2019 | Jiwani | G06Q 10/02 |
| 2019/0370922 A1* | 12/2019 | Asghari | G06Q 50/30 |
| 2020/0041291 A1* | 2/2020 | Dunnette | G01C 21/3423 |
| 2020/0065842 A1* | 2/2020 | Viswanathan | G06Q 30/0208 |

OTHER PUBLICATIONS

STIC EIC 3600 Search Report for application 16183249 dated May 20, 2020 (Year: 2020).*

* cited by examiner

ADJUSTING ROUTE PARAMETERS USING A CENTRALIZED SERVER

BACKGROUND

The present invention relates to ride share services, and more specifically, to incentivizing users of ride share services.

Commuters and travelers are increasingly relying on ride share services for transportation. These ride share services allow multiple users to share a common vehicle at a reduce fare as compared to the fares of non-ride share services. However, users of ride share typically do not partake in impulse stops, as current ride share systems do not incentivize users to add additional stops along their route. Further, the focus of ride share services is typically on the number of pickups and drop-offs a driver can make. Thus, the drivers lack an incentive to add additional stops to their routes, which increase the travel time and reduce the number of users that they are able to service. As such, physical businesses suffer due to the lack of impulse purchases that are made by people travelling past their location. Additionally, the ride share user's experience may suffer as well, as they do not have a convenient way to add stops along their route.

Thus, there is a need for an improved system for notifying ride share users of businesses that are along their route and a way to incentivize those users to place an order from one or more of the businesses.

SUMMARY

According to one embodiment of the present invention, a system for incentivizing ride share users comprising a user profile database comprising first user data, a business database, a route generator, and an advertisement generator. The route generator is communicatively coupled with a telecommunication system comprising a plurality of mobile devices. Further, the route generator configured to receive a first ride share request from a first mobile device of the plurality of mobile devices, the first mobile device corresponds to a first user of the ride share users, and generate a first route and a corresponding first fare based on a first ride share request. The advertisement generator is communicatively coupled with the telecommunication system comprising the plurality of mobile devices and configured to generate first offers based on the first user data and first route information of the first ride share request, transmit the first offers to the first mobile device of the first user, receive a selection of a first offer of the first offers from the first mobile device of the first user, adjust the first fare in response to the selection of the first offer, and transmit the adjusted first fare to the first mobile device of the first user.

In one embodiment, a method for incentivizing ride share users comprises generating first offers based on first user data and first route information of a first ride share request corresponding to a first user of the ride share users, the first ride share request corresponding to a first fare, transmitting the first offers to a first mobile device of the first user, receiving a selection of a first offer of the first offers from the first mobile device, adjusting the first fare in response to the selection of the first offer, and transmitting the adjusted first fare to the first mobile device.

In one embodiment, a computer program product for incentivizing ride share users comprises a computer-readable storage medium having computer-readable program code embodied therewith. The computer-readable program code is executable by one or more computer processors to generate first offers based on first user data and first route information of a first ride share request corresponding to a first user of the ride share users, the first ride share request corresponding to a first fare, transmit the first offers to a first mobile device of the first user, receive a selection of a first offer of the first offers from the first mobile device, adjust the first fare in response to the selection of the first offer, and transmit the adjusted first fare to the first mobile device.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe various systems and methods for incentivizing users of a ride share service. In one embodiment, offers are generated for each user of the ride share service. The offers may be an incentive for a user to stop in at a location along a corresponding route. For example, a reduction to the fares and/or a discount for a good and/or service from a businesses may be offered. Further, offers for users may be updated based on the actions by other users. For example, in response to the selection of at least one offer by a first user, an offer of a second user may be updated. In one embodiment, the offer presented to a second user may include an additional discount to the fare and/or business associated with the offer selected by the first user. Further, in various embodiments, as the number of users that participate in (e.g., select) an offer increases, the discount that corresponds to the offer may be increased. Alternatively, in response to a lack of a selection of an offer, one or more offers may be updated to further incentivize the users to select an offer. Thus, by presenting the users of the ride share service with various offers, those users may be incentivized to purchase goods and/or services from businesses along their route, increasing sales made by those businesses.

Figure 1:
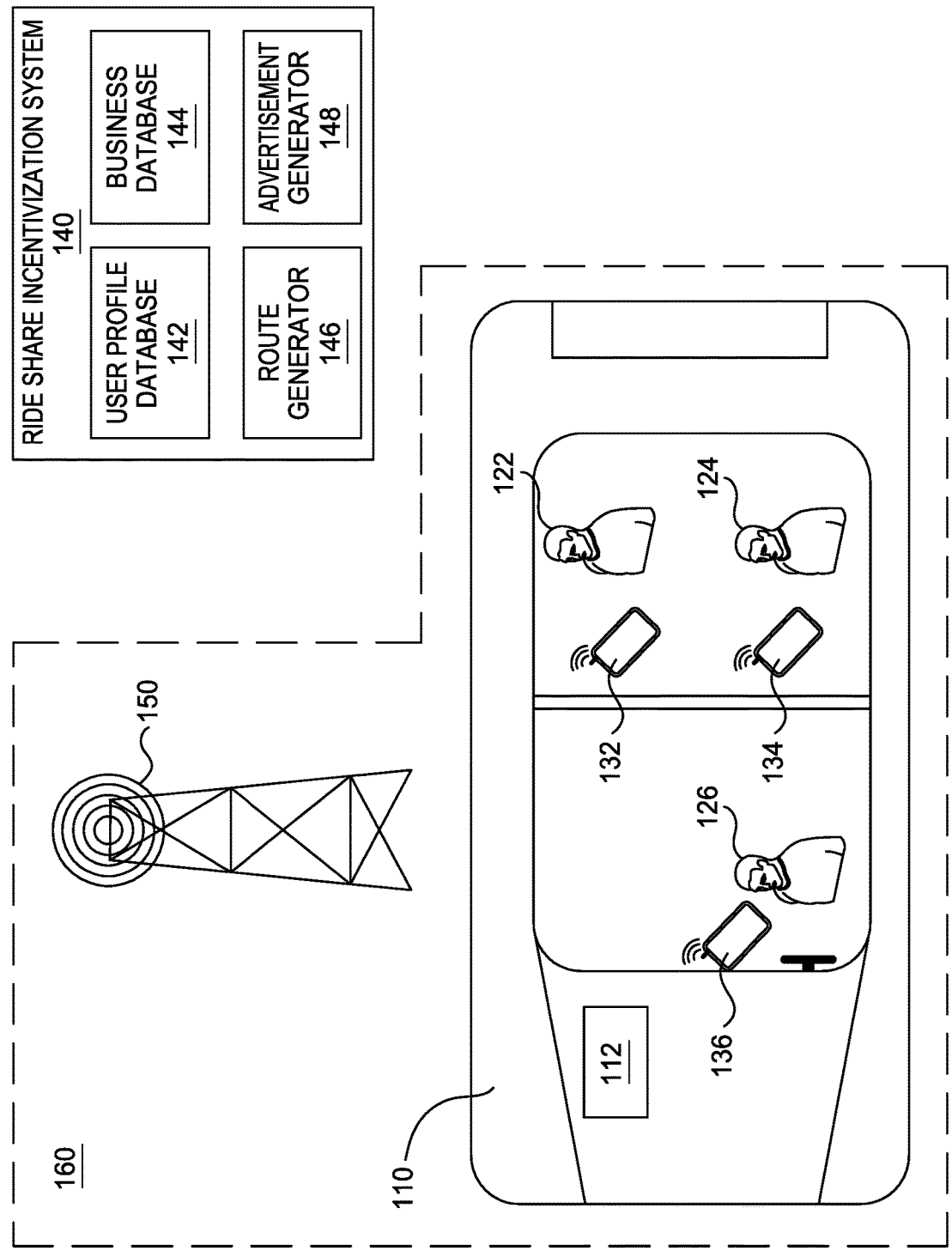
FIG. 1 illustrates a ride share incentivization system, according to one or more embodiments.

With reference now to FIG. 1. FIG. 1 illustrates a ride share incentivization system 140, according to one or more embodiments. In one embodiment, the ride share incentivization system 140 is communicatively coupled with one or more mobile devices (e.g., mobile devices 132 and 134) of one or more users (e.g., users 122 and 124). In one embodiment, the ride share incentivization system 140 is wirelessly coupled with the mobile devices 132 and 134. For example, the ride share incentivization system 140 may wirelessly communicate with the mobile devices 132 and 134 via communication tower 150.

In one or more embodiments, users 122 and 124 are located within vehicle 110. The vehicle 110 may be any type of an automobile. In one embodiment, the vehicle 110 is an autonomous vehicle that picks up the users 122 and 124 from their respective pickup locations and delivers (i.e., drop-off) the users 122 and 124 to their respective destinations. In such an embodiment, the vehicle 110 includes computer system 112. The computer system 112 may wirelessly communicate with the ride share incentivization system 140 via the communication tower 150. For example, the computer system 112 may receive pick up locations, destinations, arrival times (if provided), and route information of users 122 and 124 from the ride share incentivization system 140. Further, the computer system 112 may communicate confirmation of pickup and/or drop-off of the users 122 and/or 124, and/or confirmation of receipt of route information to the ride share incentivization system 140. In various embodiments, the computer system 112 may include one or more processors and/or memory devices.

In another embodiment, a driver 126 operates vehicle 110 to pick up the users 122 and 124 and drop-off the users 122 and 123 to their respective destinations. In such an embodiment, the mobile device 136 of the driver 126 may communicate with the ride share incentivization system 140 via the communication tower 150. For example, the mobile device 136 may receive pick up locations, destinations, arrival times (if provided), and route information of users 122 and 124 from the ride share incentivization system 140. Further, the mobile device 136 may communicate confirmation of pickup and/or drop-off of the users 122 and/or 124, and/or confirmation of receipt of route information to the ride share incentivization system 140. In one embodiment, the mobile device 136 may receive incentives to participate in the incentivization program of ride share incentivization system 140. For example, the driver 126 may receive a portion of the sales made through the ride share incentivization system 140. Further, the driver 126 may be provided with a corresponding flat payment amount based on the number of additional stops made and/or a number of users that participate select an offer.

In one embodiment, the mobile device 136 and the computer system 112 may be referred to as vehicle operator devices.

The users 122 and 124 may be participants of a common ride share, where the users share a ride service that provides users transportation to their respective destinations. In various embodiments, a ride share may be shared by two or more users. For example, while the embodiment of FIG. 1 illustrates two users sharing a common vehicle 110, in other embodiments, more than two users may share a common vehicle.

In one or more embodiments, each of the users 122 and 124 request a ride share via a mobile device 132 and 134, respectively. The mobile devices 132 and 134 may be a mobile computer (e.g., a laptop), a mobile phone, or a tablet. In another embodiment, the mobile devices 132 and 134 may be any computing device that is able to communicate with ride share incentivization system 140. Each of the ride share requests includes at least a pickup location and a destination. In one embodiment, one or more of the ride share requests includes a requested arrival time. The arrival time may correspond to a time that a user desires to arrive at the destination.

In one embodiment, the ride share incentivization system 140 includes a user profile database 142, a business database 144, a route generator 146, and an advertisement generator 148. The ride share incentivization system 140 may receive ride share requests from users 122 and 124 from the mobile devices 132 and 134, respectively. Further, the ride share incentivization system 140 may generate a route and determine a fare based on a ride share request provided by the user 122 and/or the user 124. The route may include a path for the vehicle to follow from the pickup location to the destination. The fare may correspond to a cost associated with the ride share service to deliver the user to a respective destination. In one embodiment, the route includes one or more stops to be made between the pickup location and the destination. The stops may correspond to businesses locations and/or additional pickups of one or more users.

Further, in one or more embodiments, the ride share incentivization system 140 may generate and transmit one or more offers to one or more of the mobile devices 132 and 134. The offers may include an incentive for one or more users to purchase a produce and/or service from a business. For example, the offer may include an incentive for a first user to stop at a location along a route corresponding to the first user. Further, an offer may include an incentive for a second user to stop at a location corresponding to a selected offer by the first user. In one or more embodiment, the offers include incentives for a user to stop at a location along a corresponding route. For example, the offers may include incentives in the form of discounts to the fare when a corresponding order is placed for a product and/or service. Further, the offers may include incentives in the form discounts for a product and/or service. In one or more embodiments, the offers include incentives in the form of discounts to the fares and discounts to products and/or services.

The ride share incentivization system 140 may include one or more processors and memory elements. The processors may be any general processing device, such as a central processing unit (CPU). In one embodiment, one or more of the memory elements include computer usable program code that may be executed by one or more processors of the ride share incentivization system 140 to perform the various functions of the ride share incentivization system 140. The computer usable program code may include instructions executable by one or more of the processors of the ride share incentivization system 140. In one or more embodiments, the ride share incentivization system 140 is a server computer device. Further, the ride share incentivization system 140 may be configured to operate within a cloud computing system. In such an embodiment, the ride share incentivization system 140 may operate within one or more virtual computing resources of a cloud computing provider.

In one embodiment, the ride share incentivization system 140 communicates with a telecommunication system 160 comprising a plurality of mobile devices and a communications tower. In one embodiment, the telecommunication system comprises mobile devices 132, 134, and/or 136, computer system 112, and communication tower 150.

The user profile database 142 may include user data corresponding to one or more users (e.g., users 122 and 124). The user data may include one or more dietary preferences and historical data of a user. For example, the dietary preferences may include drink preferences, food preferences, dietary constraints, etc. Further, historical data of a user may include previous orders made by the user, business ordered from, previously accepted offers, previously rejected offers, etc.

The business database 144 may include one or more businesses, products and/or services offered by each business, location of each business, operating hours of each business, and average wait time for each business. Further, the business database 144 may include an indication as to whether or not a business is partnered with the ride sharing company associated with the ride share incentivization system 140, and/or available offers for each business.

The route generator 146 may generate a route based on a ride share request provided by user 122 and/or 124. In one embodiment, a first route is generated based on a ride share request provided by user 122. The first route may be generated based on the destination provided by and the pickup location of the user 122. In one embodiment, the first route is generated based on an arrival time provided by the user 122. The arrival time may corresponds to a time provided by the user 122 provided along with the ride share request. Further, the first route may be generated or adjusted based on a ride share request provided by the user 124. For example, the first route may be adjusted to include the pickup location of the user 124 and the destination of the user 124. In one embodiment, the first route may be further adjusted based on an arrival time provided by the user 124. In one embodiment, the route generator 146 communicates the first route and any route updates to a mobile device 136 of the driver 126. In another embodiment, where the vehicle 110 is an autonomous vehicle, the route generator 146 communicates the first route and any route updates to a computer system of the vehicle 110. Further, the route generator 146 may determine a fare based on the ride share request provided by user 122 and a fare based on the ride share request provided by user 124. The fares may be communicated to the mobile devices 132 and 134 of each user. In one embodiment, the fare corresponding to the ride share request of the user 122 and user 124 may be adjusted based on one the selection of one or more offers by the users.

In one embodiment, the route generator 146 is communicatively coupled with the mobile device 132 and 134 of the telecommunication system 160. In such an embodiment, the route generator 146 may receive ride share requests from the mobile devices 132 and 134, and transmit updated routes to the mobile devices 132, 134, 136, and/or computer system 112.

In one embodiment, the route generator 146 may be part of a different computer system than that of the user profile database 142, the business database 144, and/or the advertisement generator 148. For example, the route generator 146 may be provided by a first provider and one or more of the user profile database 142, the business database 144, and the advertisement generator 148 may be provided by a second provider. In another embodiment, the route generator 146 is provided by the same provider as the user profile database 142, the business database 144, and the advertisement generator 148.

In one embodiment, the route generator 146 communicates with one or more of the user profile database 142, the business database 144 and the advertisement generator 148 internally within the ride share incentivization system 140. In one or more embodiments, the route generator 146 communicates with one or more of the user profile database 142, business database 144 and/or advertisement generator 148 via the mobile device 136 or the computer system 112.

The advertisement generator 148 may be communicatively coupled to the user profile database 142, the business database 144, and/or the route generator 146. In one or more embodiments, the advertisement generator 148 generates one or more offers and communicates the offers to the mobile devices 132, and 134 of the users 122 and 124, respectively. For example, the advertisement generator 148 may generate one or more offers based on route information of the ride share requests provided the users 122 and 124, the user data for the users 122 from the user profile database and 124 and business database. Further, the advertisement generator 148 may receive selected offers made by the users 122 and 124 generate and/or update the offers based on the selections or lack thereof. In one embodiment, the advertisement generator 148 may update the fares corresponding to the first ride share request and the second ride share request based on one or more selected offers. The updated fares may be communicated to the mobile devices 132 and 134 of the users 122 and 124, respectively.

In one embodiment, the advertisement generator 148 is communicatively coupled with the mobile device 132 and 134 of the telecommunication system 160. In such an embodiment, the advertisement generator 148 may receive ride share requests and/or selected offers from the mobile devices 132 and 134, and transmit updated routes and offers to the mobile devices 132, 134, 136, and/or computer system 112.

Figure 2:
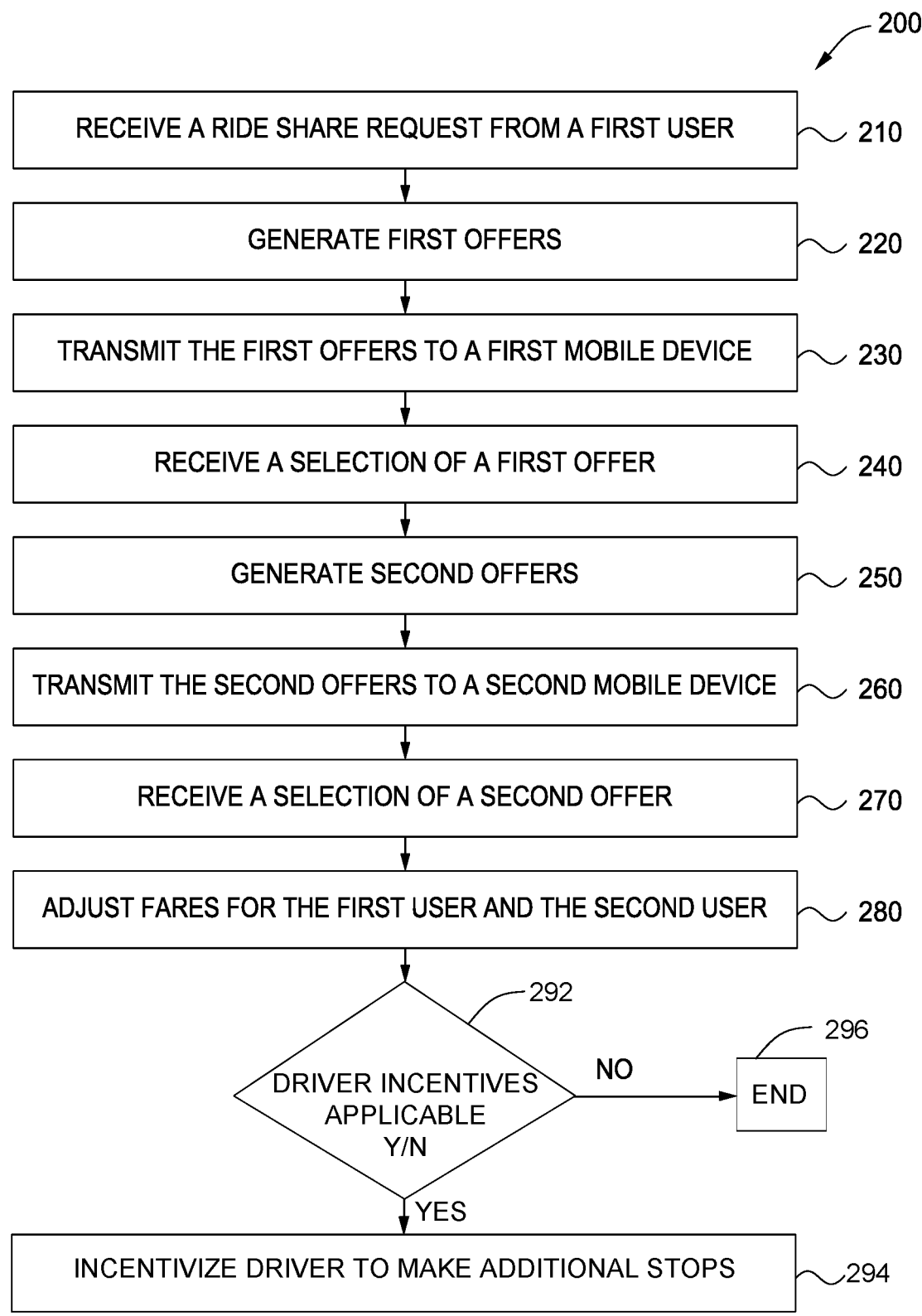
FIG. 2 illustrates a method for incentivizing a ride share user, according to one or more embodiments.

FIG. 2 illustrates a method 200 for incentivizing one or more users, according to one or more embodiments. At operation 210 of method 200, a ride share request is received from a first user. For example, a ride share request may be received by the ride share incentivization system 140 from the mobile device 132 of the user 122. In one embodiment, in response to receipt of the ride share request, route generator 146 generates a route from the pickup location to the destination of the ride share request. Further, the route generator 146 may identify one or more ride share vehicles capable of servicing the ride share request and transmits the route to at least one of the identified ride share vehicles.

At operation 220, first offers are generated. For example, in one embodiment, the advertisement generator 148 generates first offers in response to receiving the first ride share request. In one embodiment, the advertisement generator 148 accesses user data associated with the user 122 from the user profile database 142 and accesses business data associated with one or business (or locations) along the route from business database 144, and generates first offers based on the user data and business data. The first offers may include one or more offers.

At operation 230, first offers are transmitted to a first mobile device. In one embodiment, the advertisement generator 148 is configured to wirelessly transmit the first offers from the ride share incentivization system 140 to the mobile device 132 of the user 122.

At operation 240, a selection of a first offer is received. For example, in one embodiment, the selection of a first offer is received from the mobile device 132 of the user 122 by the advertisement generator 148. In one embodiment, the user 122 selects a first offer presented on the mobile device 132 and the selection is transmitted to the advertisement generator 148.

At operation 250, second offers are generated. For example, the advertisement generator 148 may generate the second offers. In one embodiment, the advertisement generator 148 generates the second offers in response to receiving a ride share request from the mobile device 134 of the user 124. For example, the advertisement generator 148 accesses user data associated with the user 124 from the user profile database 142 and accesses business data associated with one business along the route from business database 144, and generates first offers based on the user data and business data, and selected offers. The second offers may include the offer selected by the user 122 and/or an offer based on the offer selected by the user 122. For example, an offer based on the offer selected by the user 122 may include additional incentives for the user to stop at a location corresponding to a selection made by the user 122.

At operation 260, the second offers are transmitted to a second mobile device of a second user. In one embodiment, the second offers are transmitted from the ride share incentivization system 140 to the mobile device 134 of the user 124. For example, the advertisement generator 148 is configured to transmit the second offers from the ride share incentivization system 140 to the mobile device 132 of the user 122.

In one embodiment, a second offer is generated and transmitted to the mobile device 134. In such an embodiment, the second offer is based on a selected offer by the user 122.

At operation 270, a selection of a second offer of the second offers is received at the incentivization system from the mobile device of a second user. For example, in one embodiment, the advertisement generator 148 receives the selected offer from the mobile device 134 of the user 124.

At operation 280, the fares for a first user and a second user are updated in response to the selection of the offers by the first user and the second user. In another embodiment, the ride share incentivization system 140 reduces the fare for the user 122 response to receiving the selection of the offer from the user 122. Further, the fare for the user 124 may be reduced by the ride share incentivization system 140 in response to receiving the selection of the offer from the user 124. In one embodiment, the advertisement generator 148 reduces the fare of the user 122 and the fare of the user 124. For example, the advertisement generator 148 may determine a discount amount for each fare and generate a new fare based on the discount amount. In another embodiment, the route generator 146 reduces the fare of the user 122 and the fare of the user 124. For example, the advertisement generator 148 may determine a discount amount for each fare and communicate the discount amount to the route generator 146. The route generator 146 may receive the discount amount, and generate an updated fare based on the discount amount.

In one or more embodiments, the updated fares are communicated to the mobile devices 132 and 134 of the users 122 and 124. For example, one of the advertisement generator 148 and the route generator 146 may transmit the updated fares to the mobile devices.

At operation 292, a decision is made as to whether or not driver incentives are applicable. For example, in one embodiment, if there is a driver and one or more corresponding incentives available, it is determined that the driver incentives are applicable. Based upon the determination, at operation 294, a driver is incentivized to make the additional stops. For example, a driver may be presented with a portion of the purchase amount made by the users 122 and 124. In another embodiment, the driver may be presented with a fixed amount based on the number of stops added and/or the additional driving distance added to the route. In one embodiment, the advertisement generator 148 determines the driver's incentivization amount based on at least one of the amount of purchases made by the users 122 and 124, the number of additional stops added to the route, the number of users selecting offers, and the increased distance added to the route, and transmits the incentivization amount to the mobile device 136 of the driver 126. Further, the incentivization amount may be sent to a payment sent of the ride share service and then to the driver 126.

In another embodiment, if at operation 292 a determination is made that driver incentives are not applicable, the method 200 ends at operation 296. For example, the determination may be made that a driver is not available, and thus the driver incentives are not applicable. Further, a determination may be made the driver is not participating in the incentivization system, and thus the driver incentives are not applicable.

In one embodiment, the ride share incentivization system 140 may increase incentivization provided the driver 126 to as travel along the route progresses. For example, the ride share incentivization system 140 may increase the payment to the driver 125 as travel along the route progresses.

In one or more embodiments, an updated route is communicated to an operator of the vehicle 110. The updated route may be adjusted based on the selected offers by the users 122 and 124. In one embodiment, the route generator 146 may receive one or more additional stops from the advertisement generator 148 based on the selected offers, and generate an updated route including the additional stops. Further, the route generator 146 may communicate the updated route to one of the computer system 112 and the mobile device 136. In another embodiment, one or more additional stops along a route may be transmitted from the advertisement generator 148 to the mobile device 136 or the computer system 112 and then to the route generator 146, and the route generator 146 may generate an updated route including the additional stops. The updated route may be communicated from the route generator 146 to the mobile device 136 or the computer system 112. In one embodiment, the updated route is communicated along with the updated fare to the mobile devices 132 and 134.

Figure 3:
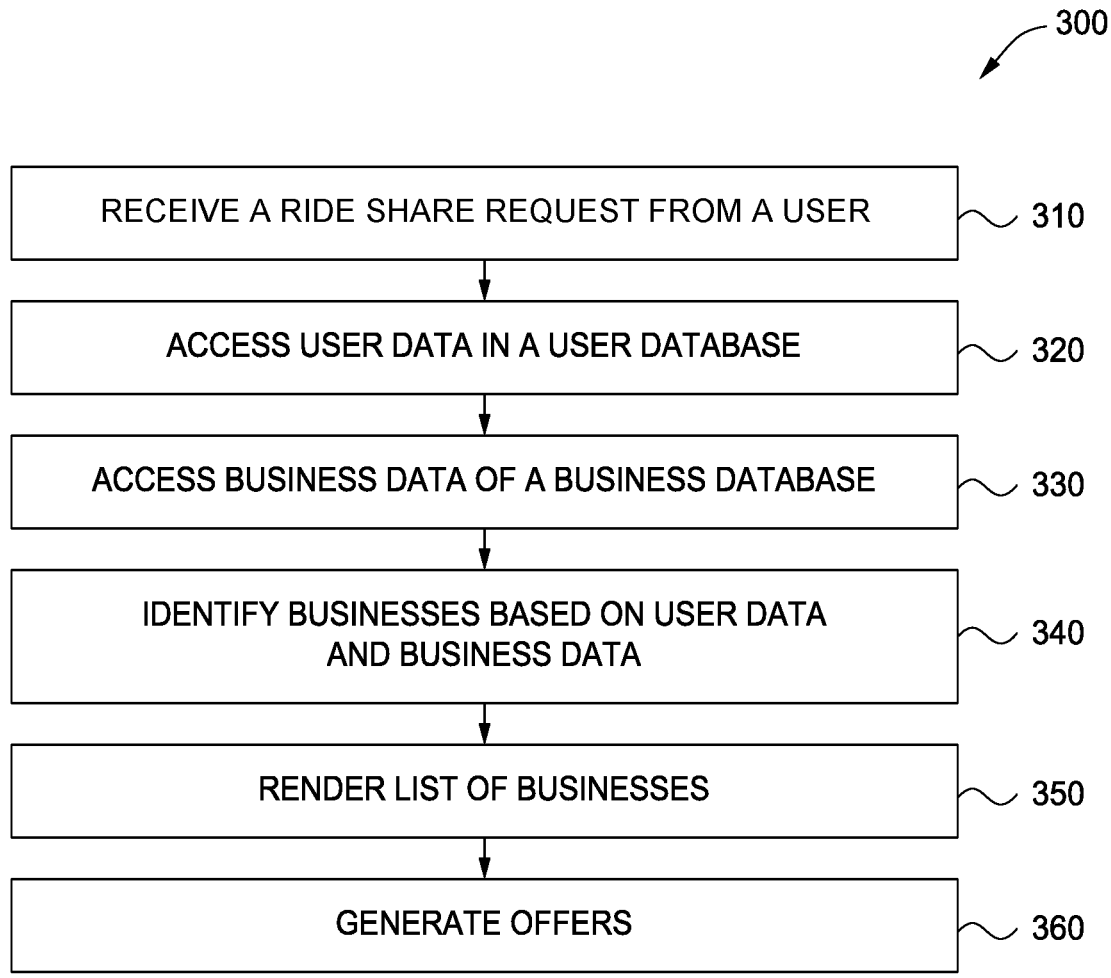
FIG. 3 illustrates a method for generating offers, according to one or more embodiments.

FIG. 3 illustrates a method 300 for generating offers, according to one or more embodiments. At operation 310, a ride share request is received from a user. The user may be a solo rider of a vehicle, or one of multiple riders of a shared vehicle. In an embodiment where there are multiple riders, the ride share request may be the first user or any subsequent user to request the vehicle via a ride share request. Further, the vehicle may have a driver (e.g., driver 126), or the vehicle may be an autonomous vehicle. The method 300 may be applied to any ride share user. For example, the method 300 may be applied to a first ride share user, a second ride share user, and/or any subsequent rider share user.

In one embodiment, a ride share request is received from the mobile device 132 of the user 122, or the mobile device 134 of the user 124. In one embodiment, the ride share incentivization system 140 receives the ride share request. The ride share request may include a pickup location and destination. The ride share request may further include a time of day and/or a destination arrival time. The pickup location may correspond to the location of the user 122 or 124 when the ride share request is sent. In one embodiment, the pickup location may be generated from global positioning system (GPS) data associated with the mobile device 132 or 134. In another embodiment, the user 122 or 124 provides a pickup location via mobile device 132 or 134.

At operation 320, user data is accessed from a user database. In one embodiment, the advertisement generator 148 accesses user data of the user 122 or 124 from the user profile database. The user data may include one or more of dietary preferences and user order history for the user 122 or 124.

At operation 330, business data within a business database is accessed. For example, business data within business database 144 may be accessed by advertisement generator 148. In one embodiment, the business data is accessed in response to receiving the ride share request. In another embodiment, the business data is accessed in response to the generation of a first route from the ride share request.

At operation 340, one or more businesses (or locations) are identified based on the user data and business data. For example, the advertisement generator 148 identifies one or more businesses based on user data corresponding to user 122 or 124 and business data associated with businesses along the route. In one embodiment, the advertisement generator 148 identifies which businesses provide one or more products and/or services that correspond to one or more parameters of user data and/or business data.

In one embodiment, the advertisement generator 148 compares the user data corresponding to the user 122 or 124 to the businesses within the business database 144 to identify which businesses provide products and/or services that match at least one parameter of the user data. For example, user data corresponding to the user 122 or 124 may identify that the user 122 or 124 prefers coffee in the morning, and the advertisement generator 148 may identify which businesses provide coffee. In other embodiments, the user data corresponding to the user 122 or 124 may identify that the user 122 or 124 has a dietary constraint in which the user is vegan, and the advertisement generator 148 may identify which businesses of the business database 144 provide vegan products. Further, the advertisement generator 148 may compare parameters of the ride share request to the businesses within the business database 144 to identify which businesses provide products and/or services that match one or more of the ride share parameters. For example, the ride share parameters may indicate that the time of day corresponds to breakfast, and the advertisement generator 148 may identify which businesses offer breakfast products. Further, the advertisement generator 148 may identify one or more businesses from the business database 144 that are proximate the route. Additionally, the ride share parameters include an arrival time, and the advertisement generator 148 may identify one or more businesses that are able to provide products and/or services such that the user 122 or 124 will be able to reach the destination by the arrival time.

At operation 350, a list of businesses is rendered. For example, the advertisement generator 148 may generate a list of businesses that were identified to provide products and/or services that correspond to at least one parameter of the user data and/or the business data. The advertisement generator 148 may prioritize businesses that are located within closer proximity to the route, have shorter wait times, and/or are partnered with the ride sharing company of the ride share incentivization system 140.

At operation 360, offers are generated. In one embodiment, the advertisement generator 148 generates offers that correspond to the identified businesses. The offers may incentivize a user to stop at a business by including one or more of a coupon or discount for a particular business and a discount to the user's ride share fare. For example, if a user orders from a listed business, the user's corresponding ride share fare may be reduced by the offered amount.

The offers may be transmitted to the mobile device 132 or 134 where they may be presented as a list within an application on mobile device 132 134.

In one embodiment, the advertisement generator 148 generates offers for user 124 that correspond to the identified businesses and to any offers selected by user 122. In one embodiment, the offers for user 124 may include an offer based on the offer selected by the first user 122. Such an offer may include an additional discount or coupon as compared the offer selected by the user 122.

In one embodiment, the advertisement generator 148 updates the offers presented to user 122 based on a selected one of the offers presented to user 124. For example, in response to the user 124 selecting one of the corresponding offers, one or more of the corresponding offers presented to the user 122 may be updated. In one embodiment, an offer not selected by the user 122 may be updated in response to the selection of an offer by the user 124. In one embodiment, updating the offers may include increasing an incentive by increasing at least one of a fare discount and a product and/or service discount in response to receipt of an offer select by the user 124.

Figure 4:
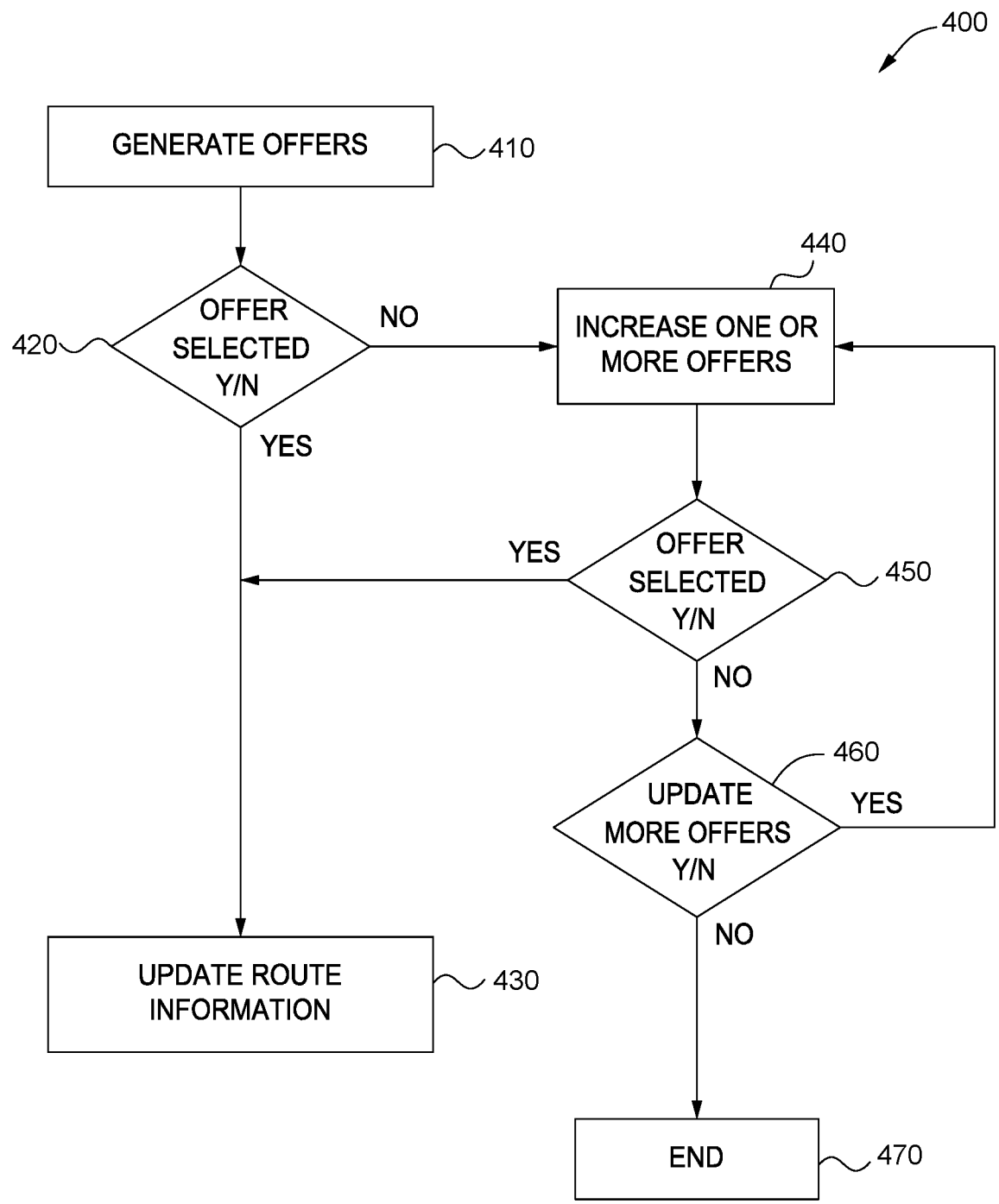
FIG. 4 illustrates a method for updating offers, according to one or more embodiments.

FIG. 4 illustrates a method 400 for updating one or more offers, according to one or more embodiments. At operation 410, offers are generated. The offers may be generated according to one or more of the method 300 and the method 400. At operation 420, a decision whether or not an offer was selected is made. In one embodiment, the advertisement generator 148 determines whether or not the user 122 or the user 124 has selected an offer. Upon determining that either the user 122 or the user 124 has selected an offer, route information may be updated at operation 430. Updating the route information may include one or more of reducing a fare, and adding a stop to the route. In one embodiment, the advertisement generator 148 updates the fare. In another embodiment, the advertisement generator 148 provides an indication to another element of the ride share incentivization system 140 to update the fare and/or route. For example, the advertisement generator 148 may provide an indication to the route generator 146 to update the route. The indication may include the additional stops to add to the route and/or an amount to reduce the fare.

Based upon a determination at operation 420 that no offer has been selected, one or more offers are increased (operation 440). Increasing an offer may include increasing an incentive by increasing at least one of an amount a fare is discounted if an offer is selected, and a discount for a product and/or service. After one or more of the offers have been increased, the updated offers may be presented to one or more of the users 122 and 124. In one embodiment, the advertisement generator 148 updates the offers and communicates the updated offers to at least one of mobile devices 132 and 134.

At operation 450, a decision whether or not an offer was selected is made. In one embodiment, the advertisement generator 148 determines whether or not the user 122 and/or the user 124 have selected an offer. Upon determining that either the user 122 or the user 124 has selected an offer, the route and/or fare may be updated at operation 430.

Based upon a determination at operation 450 that no offer has been selected, a decision is made regarding whether or not to update one or more of the offers again at operation 460. Based upon a decision to update more one or more offers, the offers may be increased at operation 440 by advertisement generator 148. Based upon a decision to not update one or more offers, the updating process may be ended at operation 470.

Figure 5:
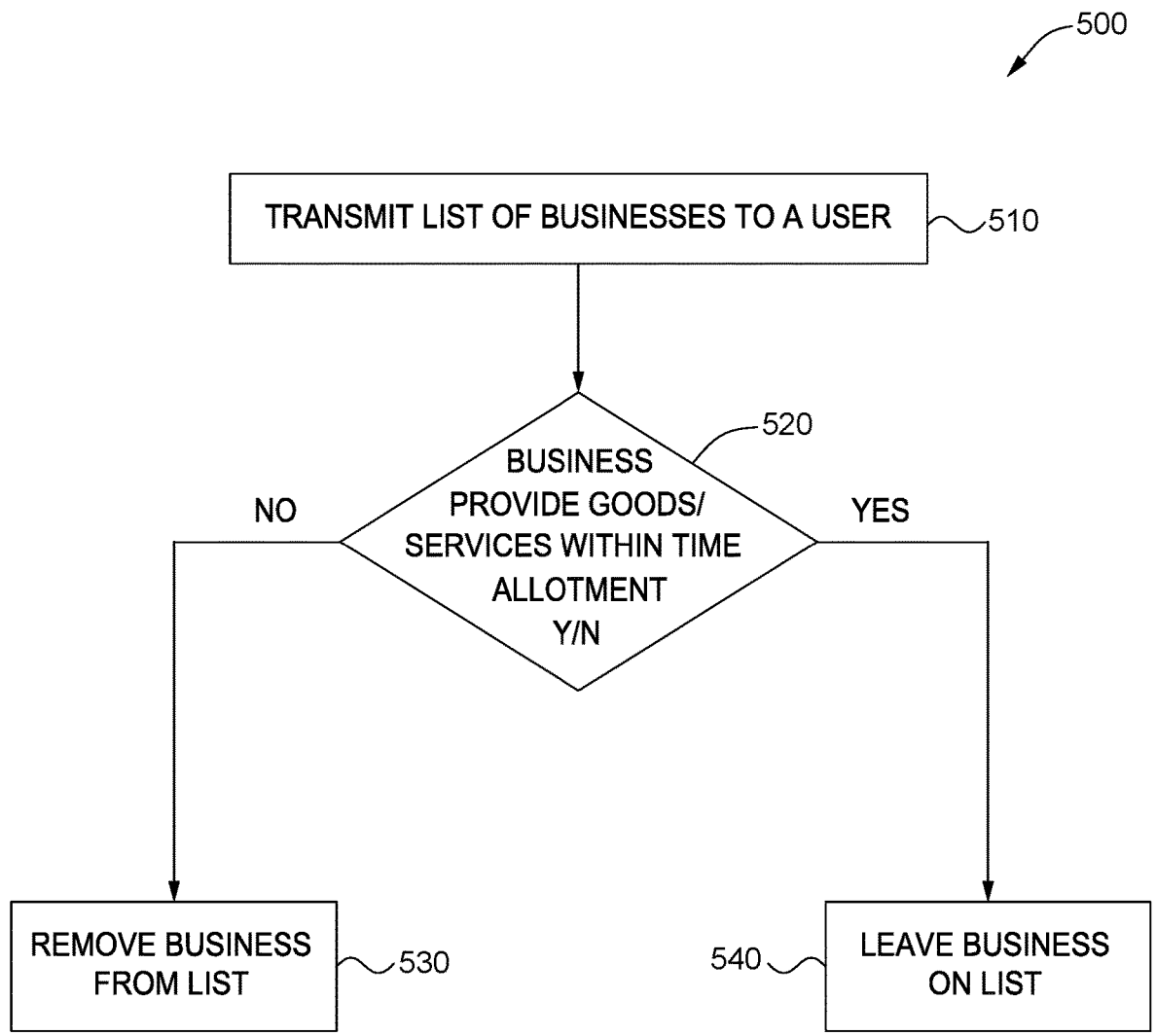
FIG. 5 illustrates a method for updating a list of businesses, according to one or more embodiments.

FIG. 5 illustrates a method for updating businesses presented to a user, according to one or more embodiments. At operation 510 a list of businesses are transmitted to a user. For example, the advertisement generator 148 may communicate a list of businesses to a mobile device (e.g., mobile device 132 or 134) of a user (e.g., user 122 or 124).

At operation 520, a decision is made whether or not a business is able to provide corresponding goods and/or services within the current time allotment. In one embodiment, the advertisement generator 148 determines whether or not a business is able to meet a time constraint corresponding to an arrival time of the user 122 or the user 124. For example, the advertisement generator 148 may determine if the wait time is too long at a business such that the business is unable to provide a product before a user provided arrival time. In another embodiment, the advertisement generator 148 may make the determination that the travel time to a business may have increased to the point where the business is unable to provide a product before a provided arrival time of a user.

In one embodiment, a timer, which may be used to determine whether or not a business may be able to provide a service and/or good within the time allotment, may be generated. The timer may be based on a current transit time and wait time at each business. In one embodiment, the timer is based on a difference between the transit time and the wait time. Further, in one or more embodiments, the advertisement generator 148 may compare the timer with arrival time, such that any business that will prevent a user from arriving at their destination by the arrival time is removed from the list.

At operation 530, based upon a determination that a business is unable to provide goods and/or services within the time allotment, the business is removed from the list. Further, at operation 540, based upon a determination that a business is able to provide goods and/or services within the time allotment, the business remain on the list.

The method 500 may be repeated such that the businesses are periodically reviewed. In one embodiment, the method 500 is repeated once every "N" minutes. In other embodiment, the method 500 may be repeated once very "N" miles.

Figure 6:
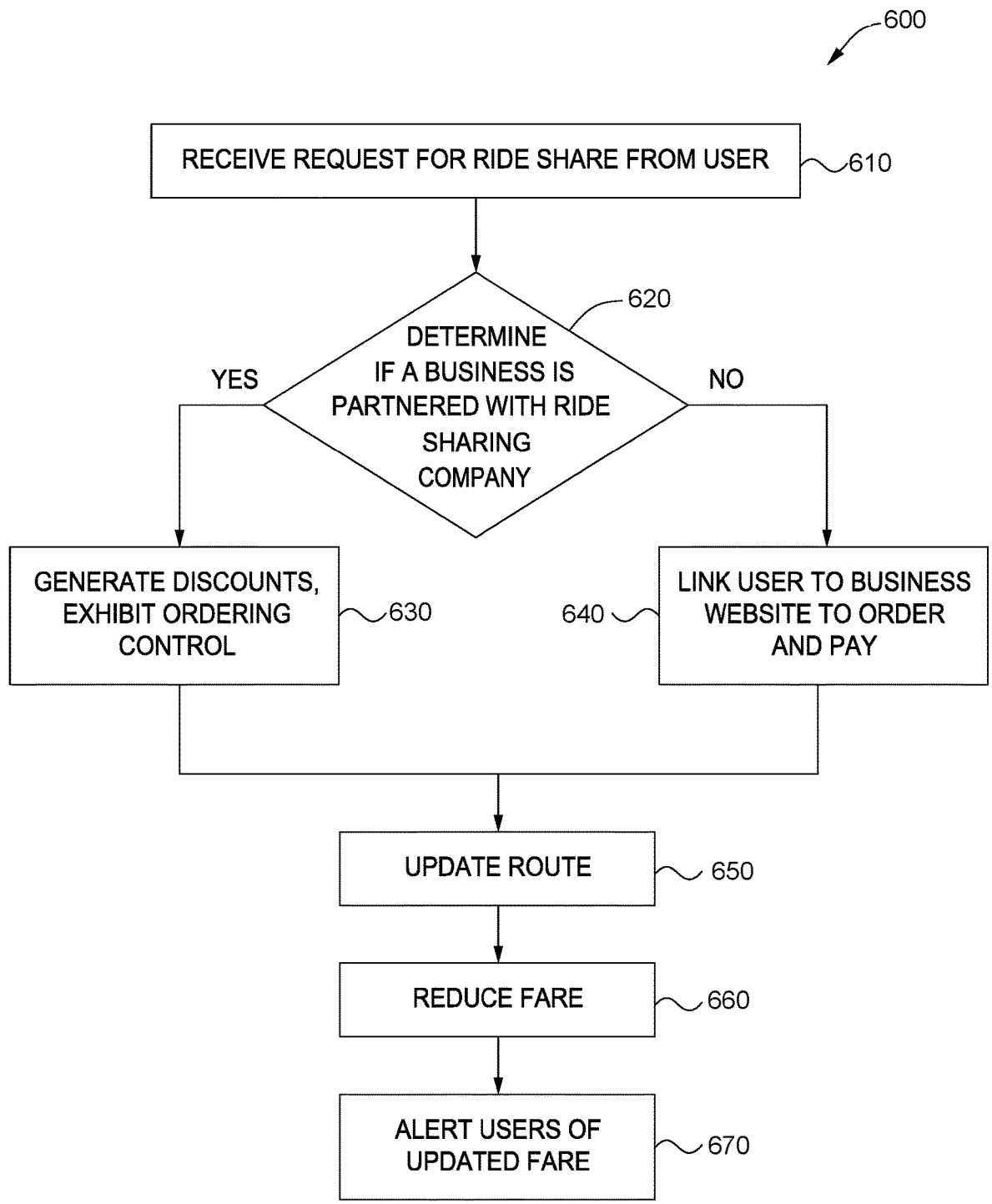
FIG. 6 illustrates a method for interacting with businesses, according to one or more embodiments.

FIG. 6 illustrates a method 600 for updating and processing fares, according to one or more embodiments. At operation 610, a request for a ride share is received. For example, a ride share request may be received from the user 122 and/or the user 124. In one embodiment, the ride share request is provided by the user 122 via the mobile device 132 and/or by the user 124 via the mobile device 134. In one embodiment, the user 122 and/or the user 124 may enter the ride share request via a ride share application running on the associated mobile devices. The ride share request may be received by the ride share incentivization system 140 via communication tower 150.

At operation 620, a determination is made whether or not a business is partnered with the ride share company associated with the ride share incentivization system 140. Based upon the determination that the business is partnered with the ride share company, business discounts and/or fare discounts may be generated. Further, the ride share incentivization system 140 may control ordering and payment of products and/or services (operation 630). In one embodiment, the advertisement generator 148 generates one or more discounts for the businesses determined to be partnered with the ride sharing company. The discounts may be in the form of a coupon and presented to the users via an offer. Further, the discounts may decrease the cost of one or more products and/or services provided by the businesses determined to be partnered with the ride sharing company. In one embodiment, the discounts may be used as incentives, to incentive a user stop at one or more of the businesses.

In one or more embodiments, an application running on one of the mobile devices 132 and 134 may allow a user to order products and/or services from those businesses that are partnered with the ride sharing company. Further, the application may process payment for the orders. In one embodiment, additional discounts may be provided to the users 122 and 124 when ordering products and/or services from business partnered with the ride sharing company as compared to ordering products and/or services from businesses not partnered with the ride sharing company.

At operation 640, based on a determination that a business is not partnered with the ride sharing company, a user (e.g., user 122 and/or 124) may be provided with link to a website of the non-partnered company or the user may be redirected to the website of the non-partnered company, from which a user may order a product and/or service.

In one embodiment, confirmation of ordering from a partnered or non-partnered company may be provided to the ride share incentivization system 140. In response, at operation 650, the route may be updated. For example, the ride share incentivization system 140 may update the route to include one or more additional stops such that the users may be supplied with their ordered goods and/or services. The advertisement generator 148 may communicate the additional stops to the route generator 146, which uses the additional stops to generate an updated route. Further, the updated route may be provided to computer system 112 of vehicle 110. In another embodiment, the updated route may be provided to the mobile device 136 of the driver 126.

At operation 660, the fare is reduced. In one embodiment, one of the advertisement generator 148 and the route generate reduce the fare. For example, the advertisement generator 148 may receive one or more selected offers and generate an updated fares based on the corresponding discount. Alternatively, the advertisement generator 148 may receive one or more selected offers, determine an amount to reduce the fare, and communicate the amount to reduce the fare to the route generator 146 which determines an updated fare. In one embodiment, the amount at which the fare is reduced corresponds to the number of users which select offers and which offers are selected. For example, if two or more users select an offer from a common business, the fare reduction may be greater than if only one user selects an offer from a business.

At operation 670, users are alerted of the updated fares. In one embodiment, the advertisement generator 148 communicates the updated fares to a mobile device (e.g., the mobile devices 132 and 134) of the users (e.g., the users 122 and 124).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A system for incentivizing ride share users, the system comprising:
    a user profile database comprising first user data;
    a business database;
    a route generator communicatively coupled with a telecommunication system comprising a plurality of mobile devices, the route generator configured to:
        receive a first ride share request from a first mobile device of the plurality of mobile devices, the first mobile device corresponds to a first user of the ride share users, the first ride share request including a destination and an arrival time; and
        generate a first route and a corresponding first fare based on the first ride share request; and
    an advertisement generator communicatively coupled with the telecommunication system comprising the plurality of mobile devices configured to:
        identify one or more businesses determined to provide at least one a product or a service based on a comparison of business data associated with the one or more businesses and the first user data, where the product and the service are associated with first user data of the first ride share request;
        generate first offers based on the identified one or more businesses;
        transmit the first offers to the first mobile device of the first user;
        receive a selection of a first offer of the first offers from the first mobile device of the first user;
        adjust the first fare in response to the selection of the first offer;
        transmit the adjusted first fare to the first mobile device of the first user; and
        remove one or more of the first offers in response to a wait time of a business of the identified one or more businesses exceeding a time allotment based on the arrival time.

2. The system of claim 1, wherein the route generator is further configured to:
    receive a second ride share request from a second mobile device of the plurality of mobile devices, the second mobile device corresponds to a second user of the ride share users, wherein the first user and the second user share a ride;
    generate a second route and a corresponding second fare based on the second ride share request; and wherein the advertisement generator is further configured to:
    generate, in response to the selection of the first offer, a second offer comprising an incentive for the second user to stop at a location corresponding to the selected first offer;
    transmit the second offer to the second mobile device of the second user;
    receive a selection of the second offer from the second mobile device of the second user;
    adjust the second fare in response to at least one of the selection of the first offer and the selection of the second offer; and
    transmit adjusted second fare to the second mobile device of the second user.

3. The system of claim 1, wherein the first offer comprises an incentive for the first user to stop at a location corresponding to the first route.

4. The system of claim 1, wherein the route generator is further configured to:
    update the first route in response to the selection of the first offer; and
    transmit the updated route to a vehicle operator device.

5. The system of claim 1 wherein the first user data corresponds to at least one of dietary preferences of the first user and historical data of the first user, and wherein the first ride share request further includes pickup location for the first user.

6. The system of claim 5, wherein generating the first offers comprises:
    determining if a business of the one or more businesses is proximate the first route;
    determining if the business is able to satisfy a time constraint based on the arrival time;
    determining if the business meets one or more parameters of the first user data; and
    adding an offer corresponding to the business to the first offers.

7. A method for incentivizing ride share users, the method comprising:
    receiving, by a route generator communicatively coupled with a telecommunication system, a first ride share request from a first mobile device of a plurality of mobile device of the telecommunication system, the first mobile device is associated with a first user, wherein the first ride share request includes a destination and an arrival time;
    generating, by the route generator, a first route and a corresponding first fare based on the first ride share request;
    identifying, by an advertisement generator communicatively coupled to the telecommunication system, one or more businesses determined to provide at least one of a product or a service based on a comparison of business data associated with one or more businesses and first user data, wherein the product and the service are associated with the first user data and the first route;
    generating, by the advertisement generator, first offers based on first user data and first route information of the first ride share request;

transmitting, by the advertisement generator, the first offers to the first mobile device;
receiving, by the advertisement generator, a selection of a first offer of the first offers from the first mobile device;
adjusting, by the advertisement generator, the first fare in response to the selection of the first offer;
transmitting, by the advertisement generator, the adjusted first fare to the first mobile device;
adjusting a non-selected offer of the first offers; and
transmitting the adjusted non-selected offer to the first mobile device.

8. The method of claim 7 further comprising:
receiving a second ride share request from a second mobile device of second user, wherein the first user and the second user share a common ride;
generating, in response to the selection of the first offer, a second offer for the second user, wherein the second offer comprises an incentive for the second user to stop at location corresponding to the selected first offer;
transmitting the second offer to the second mobile device;
receiving a selection of a second offer from the second mobile device;
adjusting a second fare of the second ride share request in response to the selection of at least one of the first offer and the second offer; and
transmitting the adjusted second fare to the second mobile device.

9. The method of claim 7, wherein the first offer comprises an incentive for the first user to stop at a location corresponding to the first route.

10. The method of claim 7 further comprising updating a route corresponding to the first ride share request in response to the selection of the first offer.

11. The method of claim 10, further comprising transmitting the updated route to a vehicle operator device.

12. The method of claim 7, wherein generating the first offers comprises:
determining if a business of the one or more businesses is proximate a route corresponding to the first route information;
determining if the business is able to satisfy a time constraint based on an arrival time of the first user;
determining if the business meets one or more parameters of the first user data; and
adding an offer corresponding to the business to the first offers.

13. The method of claim 7, further comprising removing one or more of the first offers in response to a wait time of a business exceeding a time allotment.

14. A computer program product for incentivizing ride share users, the computer program product comprising:
a computer-readable storage medium having computer-readable program code embodied therewith, the computer-readable program code executable by one or more computer processors to:
identify one or more businesses determined to provide at least one of a product or a service based on a comparison of business data associated with the one or more businesses and first user data of a first ride share request received from a first mobile device of a telecommunication system with a route generator communicatively coupled with the telecommunication system, the route generator is configured to generate a first route and a corresponding first fare based on the first ride share request, wherein the first mobile device is associated with a first user, and wherein the product and the service are associated with the first user data and the first route;
generate first offers based on first the identified one or more businesses;
transmit the first offers to the first mobile device;
receive a selection of a first offer of the first offers from the first mobile device;
adjust the first fare in response to the selection of the first offer;
transmit the adjusted first fare to the first mobile device; and
remove one or more of the first offers in response to a wait time of a business of the identified one or more businesses exceeding a time allotment based on an arrival time associated with the first ride share request.

15. The computer readable program of claim 14, wherein the computer-readable program code executable by one or more computer processors is further configured to:
generate, in response to the selection of the first offer, a second offer for a second user, the second offer comprises an incentive for the second user to stop at location corresponding to the selected first offer;
transmit the second offer to a second mobile device of the second user;
receive a selection of a second offer from the second mobile device, the second offer corresponds to the first offer;
adjust a second fare of a second ride share request corresponding to the second user in response to the selection to at least one of the first offer and the second offer; and
transmit the second adjusted fare to the second mobile device, wherein the first user and the second user share a common ride.

16. The computer readable program of claim 14 further configured to:
update a route corresponding to the first ride share request in response to the selection of the first offer and the selection; and
transmit the updated route to a vehicle operator device.

17. The computer readable program of claim 14, wherein the first user data corresponds to at least one of dietary preferences of the first user and historical data of the first user, and wherein the first ride share request includes at least one of a pickup location, a destination, a route and an arrival time for the first user.

18. The computer readable program of claim 17, wherein generating the first offers comprises:
determining if a business of the one or more businesses is proximate the first route;
determining if the business meets a time constraint, wherein the time constraint is based on the arrival time;
determining if the business meets one or more parameters of the first user data; and
adding an offer corresponding to the business to the first offers.

* * * * *